United States Patent [19]
Bilotti et al.

[11] Patent Number: 5,471,122
[45] Date of Patent: Nov. 28, 1995

[54] DC-MOTOR BRIDGE DRIVER WITH END-OF-BRAKING DETECTOR

[75] Inventors: Alberto Bilotti, Florida; Jose L. Tallarico, Buenos Aires, both of Argentina

[73] Assignee: Allegro Microsystems, Inc., Worcester, Mass.

[21] Appl. No.: 210,498

[22] Filed: Sep. 14, 1993

[51] Int. Cl.[6] .................................................. H02P 3/00
[52] U.S. Cl. ........................ 318/284; 388/907.2; 388/921
[58] Field of Search .................................. 318/254, 138, 318/439, 362, 280–286, 685, 696, 257, 265, 258, 369, 722, 723, 741, 744; 363/55, 56, 57, 44, 63; 388/805, 812, 813, 820, 917–919, 928.1, 907.2, 903, 921; 361/23, 78, 31, 79, 33, 83

[56] References Cited

U.S. PATENT DOCUMENTS

| | | | |
|---|---|---|---|
| 3,813,591 | 5/1974 | Dinger | 388/805 |
| 3,969,661 | 7/1976 | Morinaga et al. | 318/375 |
| 4,270,164 | 5/1981 | Wyman et al. | 363/56 |
| 4,493,015 | 1/1985 | Ramlohr et al. | 363/63 |
| 4,511,835 | 4/1985 | Studtmann | 318/722 X |
| 4,562,386 | 12/1985 | Goff et al. | 318/254 |
| 4,562,387 | 12/1985 | Lehnhoff | 318/285 |
| 4,562,393 | 12/1985 | Loyzim et al. | 318/257 X |
| 4,628,232 | 12/1986 | Saganovsky | 318/284 |
| 4,677,356 | 6/1987 | Tsuneda et al. | 318/258 |
| 4,680,513 | 7/1987 | Kennedy | 318/285 |
| 4,897,882 | 1/1990 | Pickering | 318/284 X |
| 5,032,780 | 7/1991 | Hopkins | 318/696 |

Primary Examiner—Jonathan Wysocki

[57] ABSTRACT

A full-bridge driver, and especially an entirely integrated bridge driver, for driving DC motors in either direction is capable of automatically braking the motor when the motor direction is to be reversed. The bridge circuit is of "H" configuration and has four transistor switches connected in bridge configuration and has two bridge output terminals to which a motor may be connected. A differential window comparator has the input connected to the two bridge output terminals, producing a high level binary signal only when the voltage across the two output terminals is within a small voltage range centered at about zero volts. A pulse-width filter circuit having an input connected to the window comparator produces a high binary output signal only when the comparator-produced binary signal remains high for greater than a predetermined time. The effect of the pulse-width filter in combination with the window comparator is to ignore the first occurrence during braking of zero motor voltage, and to recognize the second occurrence of zero motor voltage which indicates the end of the braking period at which time the motor has stopped, after which the motor can be operated in the reverse direction without creating large transient transistor and motor currents during such a transition of motor running direction.

7 Claims, 3 Drawing Sheets

5,471,122

DC-MOTOR BRIDGE DRIVER WITH END-OF-BRAKING DETECTOR

BACKGROUND

This invention relates to full-bridge drivers, for driving permanent magnet DC motors in either direction, that are capable of braking the motor when the motor direction is to be reversed, and more particularly to such a fully integratable bridge driver that additionally includes a detecting means which during braking relies upon the back-electromotive-force (b.e.m.f.) voltage of the motor for determining the time at which the motor has come to rest for signaling end-of-braking.

It is well known to employ a full bridge capable of driving a DC motor in either of the two directions. Such bridges employ four switches in H-configuration wherein the motor load constitutes the central bar in the "H". For the four bridge switches, mechanical switches or silicon controlled rectifiers have been used that are essentially precluded from being formed in an integrated circuit.

It is also well known to make full-bridge motor drivers using bipolar or field effect transistor switches. Such transistor bridge drivers have included a braking means wherein at least one of the bridge transistors is utilized to "short" the motor, i.e. place a low impedance across the motor. A means for detecting the end of braking in such prior art drivers is rarely provided but in cases where such a feature is included, it is by employment of at least one braking-current sense resistor. The sense resistor is in series with the at least one bridge transistor used for "shorting" the motor. When the motor comes to rest and the armature b.e.m.f drops to zero, the "short-circuit" motor current drops to zero as does the voltage across the sense resistor. And, when braking is required in both motor directions, two sense resistors are required.

However, the use of such series connected sense resistors has numerous disadvantages. The main motor current must also flow through the sense resistors, therefore dissipating useless power and unwanted heat. Additionally, sense resistors are generally of very low value and difficult to integrate. Thus sense resistors, used in conjunction with integrated driver circuits of the prior art, are for these reasons commonly supplied as expensive discrete resistors, external to the integrated circuit, and thus become a source of a substantial increase in the cost of the driver circuit.

It is an object of this invention to overcome the above-noted short comings of the prior art and to provide a full-bridge driver circuit for permanent magnet DC motors, which driver circuit is fully integratable and has improved means for detecting end-of-braking without the use of current-sensing resistors.

SUMMARY

This invention recognizes that in a reversing full-bridge driver utilizing one or more of the four bridge switches for braking by "shorting" the motor (through a low impedance circuit), the voltage across the motor during breaking first rises and then falls through zero voltage to an opposite polarity voltage before more slowly returning asymptotically toward zero again. The invention further recognizes that the asymptotic return of motor voltage to within a small range near zero voltage will be a practical measure of end-of-braking and that to use it requires means for ignoring the first brief fall of the motor voltage through zero.

The invention is therefore to a permanent magnet DC-motor bridge-driver circuit of the kind having four transistor switches connected in bridge configuration and having two bridge output terminals to which a motor may be connected. A differential window comparator has a differential input connected to the bridge output terminals, for producing a binary signal at a first level only when the voltage across the two output terminals is within a small voltage range centered at about zero volts. A pulse-width filter circuit having an input connected to the window comparator is for producing an output signal of a particular binary level only when the comparator-produced binary signal remains at the first level for greater than a predetermined time. The effect of the pulse-width filter in combination with the window comparator is to ignore the first occurrence during braking of zero motor voltage.

The small voltage range provided by the differential window comparator is preferably less than 50 millivolts. The pulse-width filter circuit is comprised of a signal-delay circuit having a delay time that is the above-mentioned predetermined time and the predetermined time is preferably less than 50 microseconds.

The advantages of the end-of-detection feature of this invention include the dispensing with the need for sense resistors leading to the possibility for fully integrating the motor driver and the entire associated braking circuit. Compared with the alternative prior art bridge-driver circuits that are without an end-of-braking detection feature, there are many additional advantages including avoidance of high peak currents during a change of direction, simplifying the bridge driver and eliminating high transients at start-up, the possibility of start up (e.g. in an opposite direction) immediately after braking is complete, and the possibility for merging the circuits for braking and shutoff, simplification of the associated control logic.

DESCRIPTION OF THE PREFERRED EMBODIMENTS

Figure 1:
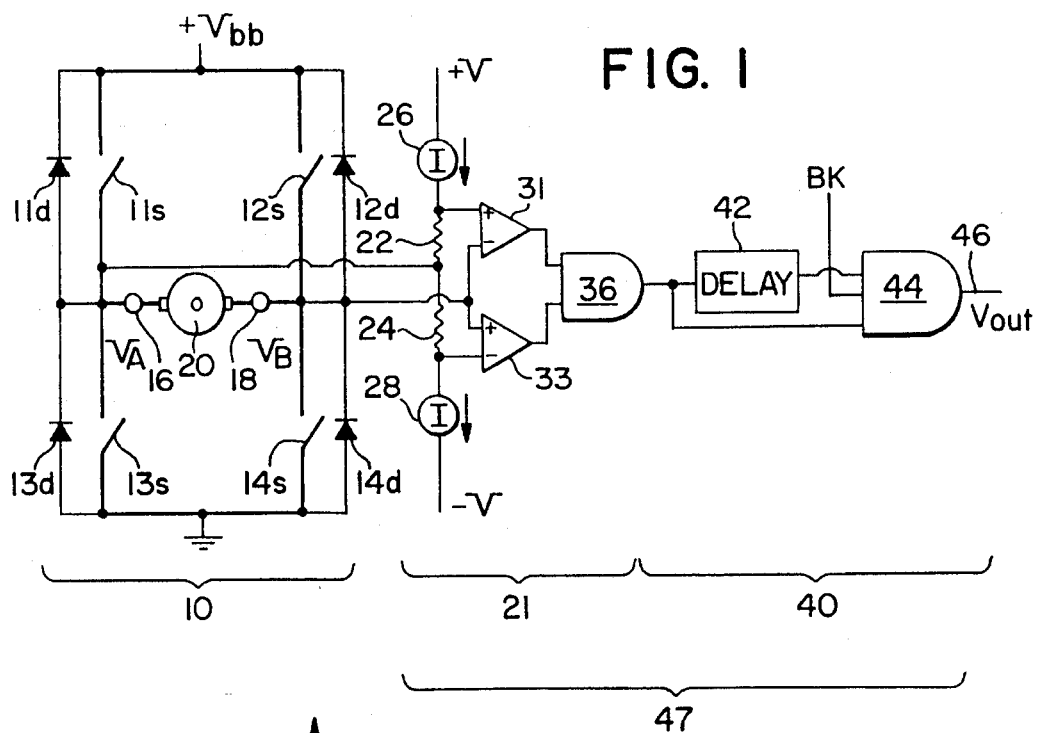
FIG. 1 shows a motor driver circuit of this invention.

The DC-motor driver circuit of FIG. 1 includes a basic full-bridge driver that has four switches 11s, 12s, 13s and 14s that may be bipolar or field effect transistor switches. Shunting each of these switches are four clamp diodes 11d, 12d, 13d and 14d, respectively, which are used to clamp transient voltage spikes for protecting the semiconductor switches 11s, 12s, 13s and 14s respectively. The bridge 10 has two output terminals 16 and 18 to which a DC motor 20 is connected.

Figure 2:
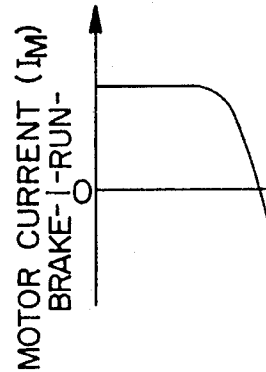
FIG. 2 shows a waveform of the motor current in the circuit of FIG. 1 during braking.
Figure 3:
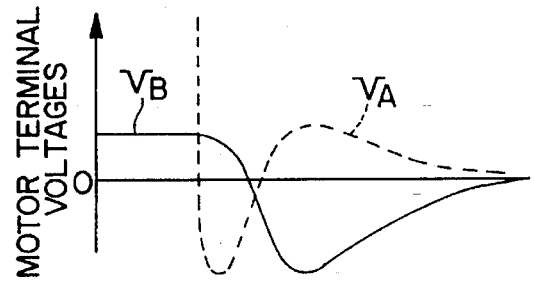
FIG. 3 shows a waveform of the voltages $V_A$ and $V_B$ at the two motor terminals, respectively, in the circuit of FIG. 1 during braking.
Figure 4:
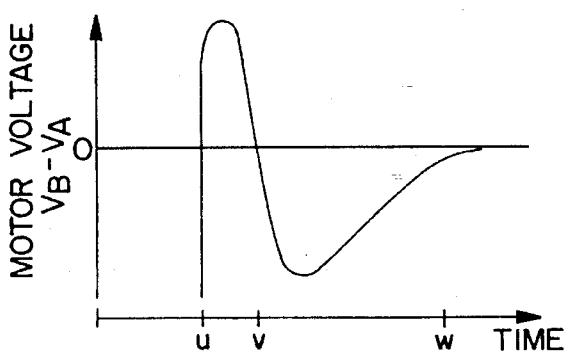
FIG. 4 shows a waveform of the motor voltage, $V_B-V_A$, at the two motor terminals in the circuit of FIG. 1 during braking. The time scales of the waveforms in FIGS. 2, 3 and 4 are the same. The voltage scales of FIGS. 3 and 4 are not the same.

Referring to FIGS. 2, 3 and 4, only the switches 11s and 14s are closed causing the motor 20 to run in a "forward" direction, whereas when only switches 13s and 12s are closed the motor is said to run in the reverse direction.

When the motor is running in the forward direction the motor current Im is positive, flowing from terminal 16 to terminal 18. Electrical braking is accomplished, for example, by opening at time u the switch 11s and closing switch 13s. Due to the motor inductance, the motor current Im will briefly continue to flow in the original (forward) direction through the motor 20 and switch 14s returning through diode 13d until the energy stored in the motor inductance is exhausted at time v.

After time v the coasting motor 20 generates at the motor terminals a back electromotive force (b.e.m.f.) voltage causing the current Im through the motor to reverse and flow through closed switch 13s and diode 14d. This b.e.m.f. generated reverse motor current Im generates in turn a reverse, or braking, motor torque. The braking phase ends when the kinetic energy stored in the rotor mass is exhausted, and the b.e.m.f. and motor current Im become zero; and the motor has reached a full stop.

Braking in both directions can be accomplished using either just the upper pair of switches 11s and 12s and diodes 11d and 12d, or just the lower pair of switches 13s and 14s and diodes 13d and 14d. If a full bridge driver has control circuits that automatically reverse the motor only after an end-of-braking signal is received, b.e.m.f. of the motor essentially never appears across and tends to break down the two bridge transistor switches which are not used for braking. Only in this special case, the protective diodes conventionally connected in parallel with the transistor switches which are not used for braking may be eliminated.

The output of the bridge is the motor voltage $V_B-V_A$ appearing across the bridge output terminals 16 and 18. The bridge output is connected to the input of a conventional differential window comparator 21.

Figure 5:
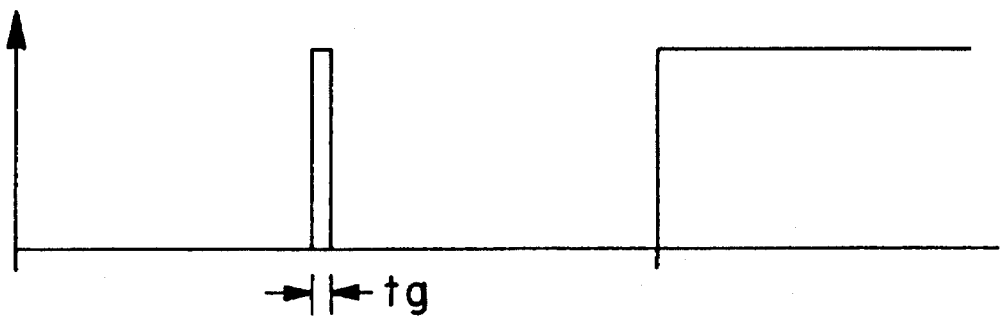
FIG. 5 shows a waveform of the binary-signal voltage produced during braking at the output of the window comparator of FIG. 1.
Figure 6:
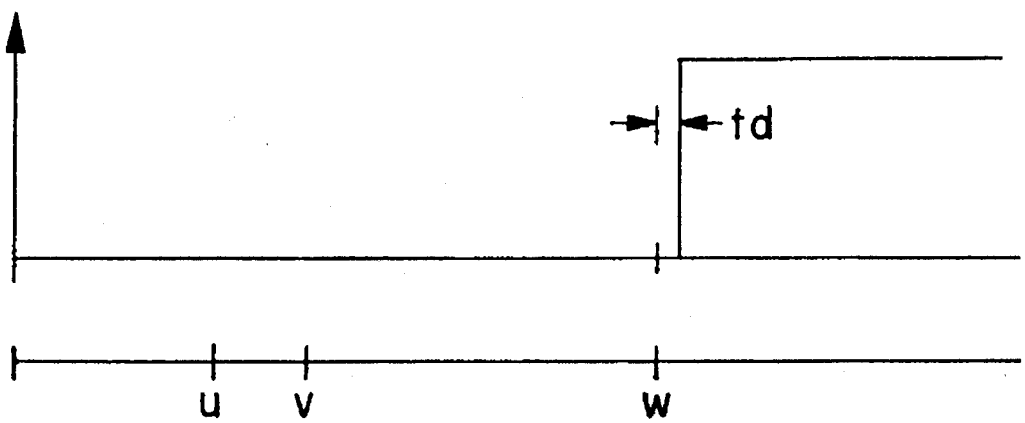
FIG. 6 shows a waveform of the binary-signal voltage produced during braking at the output of the pulse-width filter of FIG. 1.

Comparator 21 is comprised of a pair of essentially identical resistors 22 and 24, and a pair of essentially identical current sources 26 and 28, which are series connected with the pair of resistors between a positive supply voltage $+V$ and a negative supply voltage $-V$. The comparator 21 further includes an amplifier 31 having a positive input connected to resistor 22, and another amplifier 33 with a negative input connected to resistor 24. The positive and negative inputs respectively of amplifiers 31 and 33 are connected to each other and to the bridge output terminal 18. the junction between the resistors 22 and 24 is connected to the bridge output terminal 16. Comparator 21 also has an AND gate 36 with two inputs connected respectively to the outputs of the two amplifiers 31 and 33 so that when the voltage at the comparator input voltage lies within a small voltage range near zero, a high binary voltage is produced at the AND gate output, and otherwise a low binary voltage is produced as shown in FIG. 5.

Referring again to the motor voltage waveform of FIG. 4, at time v, when the effective motor braking action begins, the motor voltage falls quickly passing through the comparator window in the small voltage range centered at about zero volts. At that time a narrow (high binary level) pulse of width $t_g$ is produced at the output of the AND gate 36 as shown in FIG. 5. The motor voltage falls further and then asymptotically approaches zero volts again. When the motor voltage again falls within the window of comparator 21, the comparator output goes high, indicating the end of motor braking action.

The output of the window comparator is connected to the input of a pulse-width filter 40 having a signal delay circuit 42 of fixed delay time $t_d$ and has an AND gate 44 with one input connected to the output of the delay circuit 42. The input of the delay circuit 42 is the input of the pulse-width filter circuit 40 which is also connected to another input of the AND gate 44. The output conductor 46 of the AND gate 44 is the output of the filter circuit 40 and of the entire end of braking circuit 47 in FIG. 1.

At the beginning of braking, time v, the comparator 21 produces the narrow pulse of width $t_g$. When the width $t_g$ of this pulse is less than the delay time $t_d$ of the pulse-width filter 40, the binary voltage at output conductor 46 remains low. But at the end of motor braking action at time w when the motor voltage is again within the comparator window and is at near zero for a time exceeding $t_d$, the output voltage level at conductor 46 goes high to signal the end of braking.

For almost all permanent magnet DC motors having a full load current rating of up to about 3 amperes, for which motors the present invention is especially useful, the pulse width $t_g$ is approximately 50 microseconds. The delay time $t_d$ should be made great enough to insure that the output voltage at conductor 46 does not respond to the first passage through zero of the motor voltage to avoid a premature false indication of end of braking.

Figure 7:
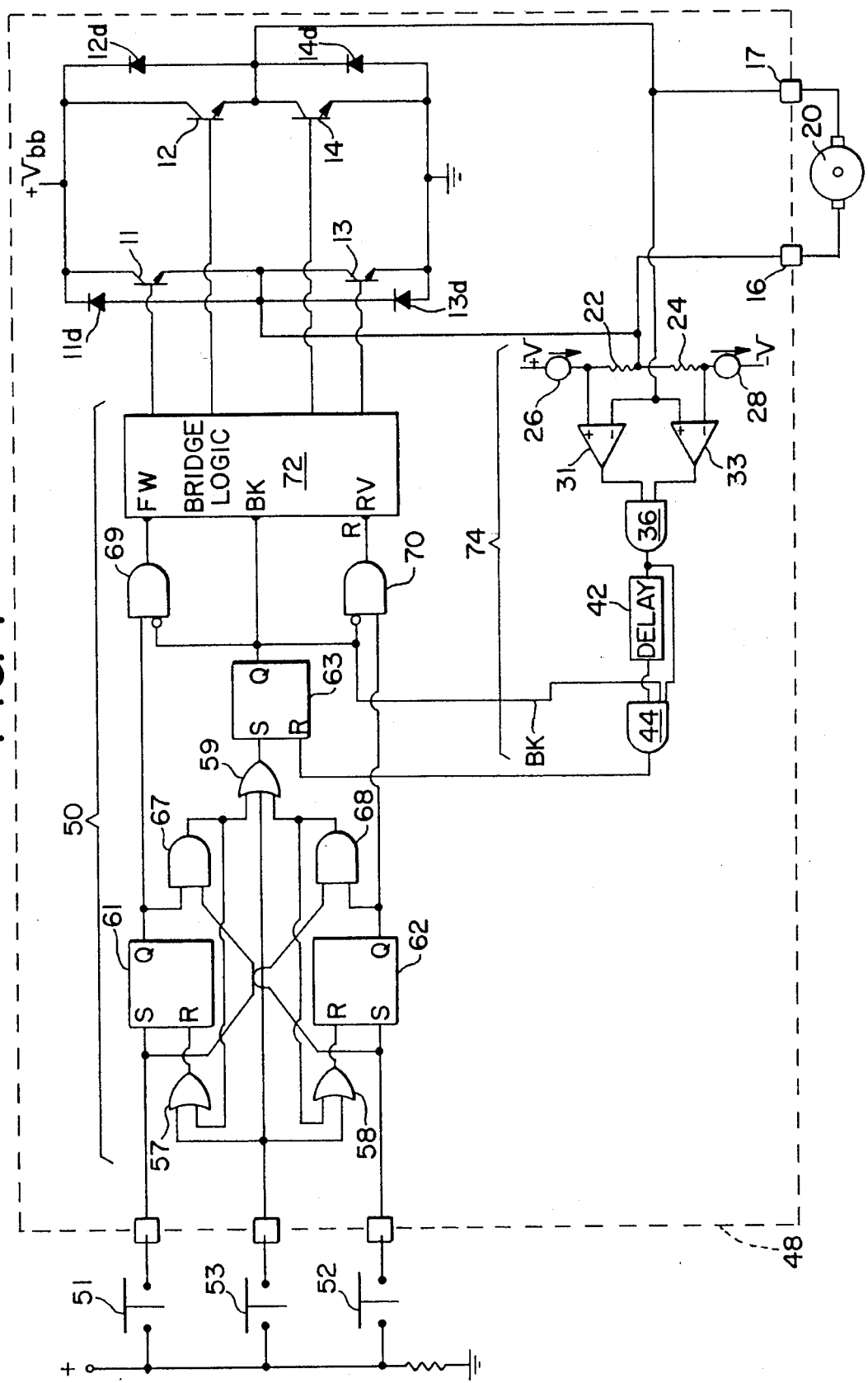
FIG. 7 shows a further developed motor driver circuit of this invention including the end-of-braking detector employed in FIG. 1.

The integrated-circuit DC-motor driver 48 of FIG. 7 includes the bridge and the end-of-braking detector of FIG. 1, and control logic 50 whereby the motor direction is controlled, and whereby feedback from the end-of-braking detector is provided to automatically brake the motor each time a signal to reverse motor direction is received, prior to the reversal of the motor direction.

The motor 20 can be started in the forward direction, in the reverse direction or braked by means of the three momentary push buttons 51, 52 and 53, respectively. The symmetrical motor control logic 56 includes three OR gates 57, 58 and 59, three set-reset latches 61, 62 and 63, four AND gates 67, 68, 69 and 70, and a bridge-logic block 72.

Operation of the motor driver of FIG. 7 is as follows: The bridge logic block 72 turns on only bridge transistors 11 and 14 to cause the motor 20 to run in the forward direction when latch 61 is set and the binary signal level FW at the input of the bridge logic block 72 is high. Conversely when RV is high, only transistors 12 and 13 are turned on. When the brake signal BK at the input of the bridge logic block 72 is high, a motor braking phase begins and when BK is low braking action stops.

Assume that the three set-reset latches 61, 62 and 63 are in the reset state, which produces three binary low level signals FW, BK and RV at the inputs of the bridge logic block 72. If the forward direction command button 51 is pushed momentarily, latch 61 becomes set and binary signal FW is now high and the motor will start running in the forward direction.

When subsequently the push button 52 becomes activated, latch 62 will become set, while latch 61 becomes reset via OR gate 57. The pulse generated at the output of AND gate 67 will set, via OR gate 59 latch 63, via OR gate 59, so that via AND gates 69 and 70 a high FW or RV signal is blocked and prevented from activating the motor 20 in either forward or reverse directions, and the binary input signal BK to the bridge logic block 72 becomes high and will initiate a motor braking phase.

During that braking phase, the rotational inertia of the motor keeps it running, and the end-of-braking detector 74 produces a low binary output signal. When the end of braking is detected the end-of-braking detector 74 produces a high binary output that resets latch 63 and allowing at the same time the binary reverse signal RV to start the motor in the reverse direction.

In the above given example, if the motor 20 was first running in the reverse direction and the forward control push button 51 is pushed, a braking phase ensues as in the example above followed by starting the motor running in the forward direction, owing to the symmetry in the motor control logic 50.

Thus due to the action of the end-of-braking detector, a reversed polarity voltage is applied via the bridge to the motor only after it has reached a full stop at the end of a braking phase. Therefore large transient currents that could affect the integrity of the semiconductor switches or the motor are avoided.

It is also notable that there are no resistors in the bridge circuit branches that carry motor currents, and thus a relatively simple low cost integrated circuit (48) has become possible, providing motor control circuitry, and automatic braking when commands of motor reversal are applied; this combination of features is made possible for the first time, attributable to the simple energy efficient end-of-braking detector disclosed herein.

We claim:

1. A full-bridge permanent magnet DC-motor driver circuit of the kind having four transistor switches connected in bridge configuration and having two bridge output terminals to which a motor may be connected, wherein the improvement comprises:

an end-of-braking detector including:
  a) a differential window comparator having a differential input connected to said bridge output terminals and having a comparator output, for producing a binary signal of a first level at said comparator output only when the voltage across said two bridge output terminals is within a small voltage range centered at about zero volts; and
  b) a pulse-width filter circuit means having an input connected to said window comparator output and having a filter circuit output, for producing an end-of-braking signal of a particular binary level at said filter circuit output only when said comparator-produced binary signal remains at the first level for greater than a predetermined time.

2. The driver circuit of claim 1 wherein said pulse-width filter means is comprised of a signal-delay circuit having a delay time that is said predetermined time.

3. The driver circuit of claim 2 wherein said pulse-width filter means is additionally comprised of an AND gate having two inputs, the input of said signal-delay circuit, serving as said input of said pulse-width filter circuit means, being connected to one of said AND gate inputs, and the output of said signal-delay circuit being connected to the other of said AND gate inputs.

4. A full-bridge permanent-magnet-DC-motor driver comprising:
  a) a full-bridge including a pair of DC voltage supply terminals, an upper pair of transistor switches connected to one of said DC supply terminals and a lower pair of transistor switches connected to the other of said DC supply terminals, a first of said upper pair transistors and a first of said lower pair transistors connected in series between said DC supply terminals, a second of said upper pair transistors and a second of said lower pair transistors connected in series between said DC supply terminals, two bridge output terminals connected respectively to the junctions between said series-connected first transistors and said series-connected second transistors; and
  b) an end-of-braking detector comprising a differential window comparator having a differential input connected to said bridge output terminals and having a comparator output, for producing a binary signal of a first level at said comparator output only when the voltage across said two bridge output terminals is within a small voltage range centered at about zero volts; and a pulse-width filter circuit means having a filter circuit output and having an input connected to said window comparator output, for producing an end-of-braking signal of a particular binary level at said filter circuit output only when said comparator-produced binary signal remains at the first level for greater than a predetermined time.

5. The DC-motor driver of claim 4 additionally comprising a bridge-control logic means having four outputs connected respectively to said four transistor switches for, when a DC permanent-magnet motor is connected to said bridge output terminals, turning on only said first upper and second lower transistor switches to cause the motor to run in one direction, and for turning on only said second upper and first lower transistor switches to cause the motor to run in the other direction, and for turning on only one pair of said upper pair and said lower pair switches for shorting the motor and braking its running in either rotational direction.

6. The DC-motor driver of claim 5 wherein only said one pair transistor switches each have a diode connected in parallel therewith for conducting during said braking respectively in the one and the other direction.

7. The DC-motor driver of claim 5 wherein said filter circuit output is connected to said bridge-control logic means for preventing the turning on of either said first upper and second lower pair of transistor switches, or said second upper and first lower pair of transistor switches, except when said end-of-braking signal is at the particular binary level.

* * * * *